United States Patent [19]

McDonald et al.

[11] Patent Number: 5,954,052
[45] Date of Patent: Sep. 21, 1999

[54] SAFETY STOWAGE APPARATUS FOR CREW OXYGEN MASKS

[75] Inventors: Tom McDonald, Overland Park; Gary R. Hannah, Merriam, both of Kans.

[73] Assignee: Nellcor Puritan-Bennett, Pleasanton, Calif.

[21] Appl. No.: 08/859,972

[22] Filed: May 21, 1997

[51] Int. Cl.⁶ .................................................... A62B 18/08
[52] U.S. Cl. ..................................... 128/206.27; 206/485
[58] Field of Search .......................... 128/204.29, 205.25, 128/206.21, 206.77; 206/485, 803, 282, 283, 292, 304.2, 485.1, 756, 763

[56] References Cited

U.S. PATENT DOCUMENTS

| | | |
|---|---|---|
| 2,378,468 | 6/1945 | Deming . |
| 2,449,548 | 9/1948 | Burns . |
| 3,379,195 | 4/1968 | Bleach ............................. 128/206.27 |
| 3,528,414 | 9/1970 | Schueller . |
| 3,599,636 | 8/1971 | Gutman et al. . |
| 3,608,574 | 9/1971 | Beaussant . |
| 3,672,384 | 6/1972 | Hellquist . |
| 4,172,455 | 10/1979 | Beaussant . |
| 4,230,097 | 10/1980 | Beaussant . |
| 4,437,462 | 3/1984 | Piljay et al. . |
| 4,445,613 | 5/1984 | Cassidy ................................. 206/418 |
| 4,546,491 | 10/1985 | Beaussant . |
| 4,577,375 | 3/1986 | Beaussant . |
| 4,616,646 | 10/1986 | Beaussant . |
| 4,664,108 | 5/1987 | Ansite ............................... 128/202.26 |
| 4,915,106 | 4/1990 | Aulgur et al. . |
| 5,036,846 | 8/1991 | Aulgur et al. . |
| 5,488,948 | 2/1996 | Dubruille et al. ................. 128/206.27 |
| 5,630,412 | 5/1997 | Dubruille et al. ................. 128/206.27 |
| 5,664,566 | 9/1997 | McDonald et al. ................ 128/205.25 |
| 5,771,886 | 6/1998 | Maire et al. ....................... 128/206.27 |

FOREIGN PATENT DOCUMENTS

| | | |
|---|---|---|
| 8730884 | 1/1987 | European Pat. Off. . |
| 2145767 | 4/1985 | United Kingdom . |
| WO 90/0258 | 3/1990 | WIPO ............................... 128/206.27 |

Primary Examiner—Mark O. Polutta
Assistant Examiner—Joseph F. Weiss, Jr.
Attorney, Agent, or Firm—Hovey, Williams, Timmons & Collins

[57] ABSTRACT

A box (10) for safe stowage of a flight crew oxygen mask (16) having an inflatable harness (35) and a switch-on/switch-off comfort adjustment system is provided which ensures that the mask (16) is properly stowed only when the switch member (40) controlling the comfort adjustment system is shifted to the switch-off or "emergency" position. The box (10) is preferably designed for mounting on the cockpit floor within close proximity to the intended wearer for one-handed retrieval of the mask (16) from within the box (10) and includes walls (24–32) defining an enclosure for receiving the mask (16), an apertured top cover (18) permitting a portion of the mask (16) to protrude therethrough for ready access by the wearer, and two inwardly extending abutment elements (20, 22) attached to opposing walls (24, 26) of the box. One of the abutment elements (22) is configured for receiving and supporting the body (34) of the mask (16) and the other abutment element (20) is configured for presenting an interference with the switch member (40) and thereby preventing proper mask stowage when the switch member (40) is shifted to the switch-on or the "comfort" position, while otherwise permitting proper stowage of the mask (16) when the switch member (40) is shifted to the switch-off or "emergency" position. Once properly stowed, the abutment elements (20, 22) will also serve to prevent shifting of the switch member (40) from the switch-off or "emergency" position to the switch-on or "comfort" position. The box (52) may also be designed for mounting on the cockpit wall within close proximity of the intended wearer.

12 Claims, 2 Drawing Sheets

SAFETY STOWAGE APPARATUS FOR CREW OXYGEN MASKS

BACKGROUND OF THE INVENTION

1. Field of the Invention

The present invention relates to stowage box devices designed to safely accommodate inflatable harness-type aircraft crew masks equipped with a harness-inflation comfort control feature. The boxes of the invention prevent mask storage in a condition with the comfort control feature enabled, so as to preclude a situation where the mask is not rapidly donnable in a stowed, putatively "ready" condition. More particularly, the invention pertains to such stowage boxes including strategically located stop and containment structure rendering it effectively impossible to store the switchable comfort control masks in the switch-on comfort control position.

2. Description of the Prior Art

Safety considerations and governmental regulations prescribe that flight crew oxygen masks should be constructed to enable the mask to be quickly donned (within a few seconds) using only one hand. Donning the mask in this manner during an emergency situation allows the wearer to use the remaining hand to attend to the aircraft controls. To enable quick donning, storage of the mask is normally provided within close proximity to a crew member's seat for one-handed access by the user. For example, the stowage box could be mounted on the floor of the cockpit or on the cabin wall adjacent the crew member.

Quick-donning inflatable head harnesses for flight crew oxygen masks are known in the art and typically comprise an expandable harness or strap having ends attached to the mask. The harness includes a manually operated valve which controls delivery of pressurized air through the harness for inflation thereof. Upon opening of the valve, pressurized air causes rapid expansion of the harness to a somewhat rigid, self-sustaining, enlarged orientation. The valve also serves to automatically vent the pressurized air and thereby deflate the harness completely once the harness and mask have been properly donned by the wearer and the valve is released. After such deflation has occurred, the inherent resiliency of the harness firmly pulls the mask around the nose and mouth areas of the wearer's face. In this manner, the mask remains tightly secured against the wearer's face in order to prevent leakage of oxygen around the periphery of the mask.

If the aircraft is flying at high altitudes and suddenly experiences rapid decompression, the flight crew mask must be pressurized in order to force air into the wearer's lungs. In this situation, the harness must exert rather significant forces urging the mask against the wearer's face in order to overcome the pressure of the oxygen flowing within the mask. However, it has been found that substantial discomfort and fatigue to the wearer are experienced when wearing such tightly fitting masks over long periods of time.

Adjustable crew mask comfort control systems are known in the art as a means for effectively alleviating discomfort which can be caused by the full deflation of a pneumatically expandable mask harness. Such comfort adjustment systems typically comprise a valve mechanism that allows only partial deflation of the harness once the valve is released and also serves to slowly reinflate the harness to a limited extent in order to slightly diminish the tension or "pull" caused by the deflated harness. One such design, as described in French Patent No. 2,614,208, includes a valve mechanism having an external comfort control switch with at least two positions. In the switch-on or "comfort" position, the user can manually adjust the valve to enable only partial deflation to a certain comfort level after full inflation of the harness is achieved optimum comfort is obtained. In the switch-off or "emergency" position, operation of the mask is identical to that of the mask without the comfort adjustment system, and full and quick inflation of the harness is therefore permitted for rapid donning, while full deflation of the harness will occur once the valve mechanism is released.

It will be appreciated that if the mask is not being worn, it should be stored with the comfort control switch in the switch-off or the "emergency" position. If the mask is instead stored in the switch-on or "comfort" position, the harness would not be subjected to full inflation pressure upon retrieval and the user would be unable to quickly and easily don the mask using one hand. To avoid that situation, a stowage box for holding the crew mask should be constructed to allow insertion of the mask therein only if the control switch is in the switch-off or "emergency" position. However, despite attempts to create a stowage box that provides such safety measures, experience has proven that stowage of the crew mask with the control switch in the switch-on or "comfort" position still occurs regularly notwithstanding such specially constructed stowage boxes including to prevent such improper stowage.

SUMMARY OF THE INVENTION

The present invention overcomes the problems outlined above and provides a greatly improved stowage box for a flight crew oxygen mask having an inflatable harness and a switch-on/switch-off comfort adjustment system of the type described in French Patent No. 2,614,208. That is to say, the stowage box hereof is specially designed to prevent storing of the crew mask within the box when the comfort control switch is in the switch-on or "comfort" position. By preventing such improper stowage, the stowage box of the present invention ensures that the mask will always be stored in the switch-off or "emergency" position and therefore be available for immediate and effortless donning in the event an emergency suddenly arises, such as rapid decompression or smoke within the cockpit.

The preferred embodiment of the present invention includes an enclosure for receiving the crew mask having front, rear and sidewalls and an apertured top cover that permits partial protrusion of the mask body for immediate one-handed access by the wearer. The box, which is preferably mounted on or near the cockpit floor and within close proximity of the intended wearer, further includes two cooperating inwardly extending abutment elements which are attached to each of the front and rear walls, respectively. The abutment element attached to the rear wall of the box presents a horizontal upper surface situated on a plane below the opposing element coupled to the front wall. This upper surface serves to receive and support the face-engaging periphery of the mask so that the opposing front wall element creates a dimensional interference preventing storage of the mask when the switch is in the switch-on or "comfort" position.

Advantageously, the abutment element attached to the rear wall provides a smoothly contoured oblique surface extending rearwardly from the inboard edge of the upper surface thereof toward the rear wall. This configuration serves to prevent ensnarement of the harness on such abutment element during quick retrieval of the mask from the box.

In another embodiment of the present invention, the stowage box is mounted on the cockpit wall within close proximity of the intended wearer. This wall structure provides an enclosure for receiving the mask, while permitting protrusion of a portion of the mask body for ready access by the wearer. The box further includes an elongated band operatively coupled at each side of the structure and having sufficient length to span the opening of the box while engaging and retaining the mask body stored therein, but only to the extent the switch is in the switch-off or "emergency" position. The band further includes an outwardly extending abutment element located between the ends of the band which provides an appropriate interference with the comfort control switch by preventing shifting of the switch to the switch-on or "comfort" position after the mask has been properly stored in the enclosure.

DETAILED DESCRIPTION OF THE PREFERRED EMBODIMENTS

Figure 1:
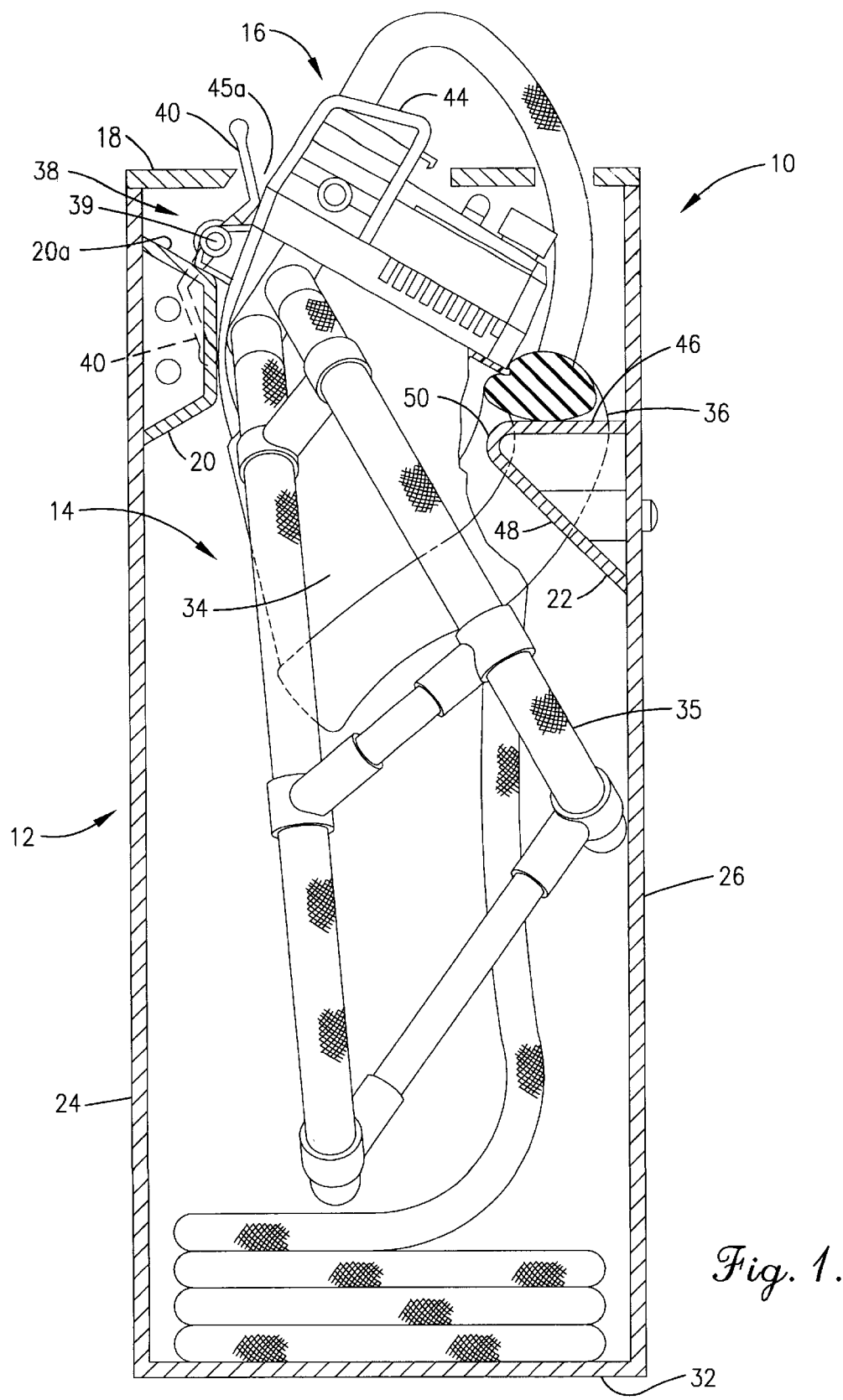
FIG. 1 is a vertical sectional view of a stowage box constructed in accordance with the preferred embodiment of the present invention.
Figure 2:
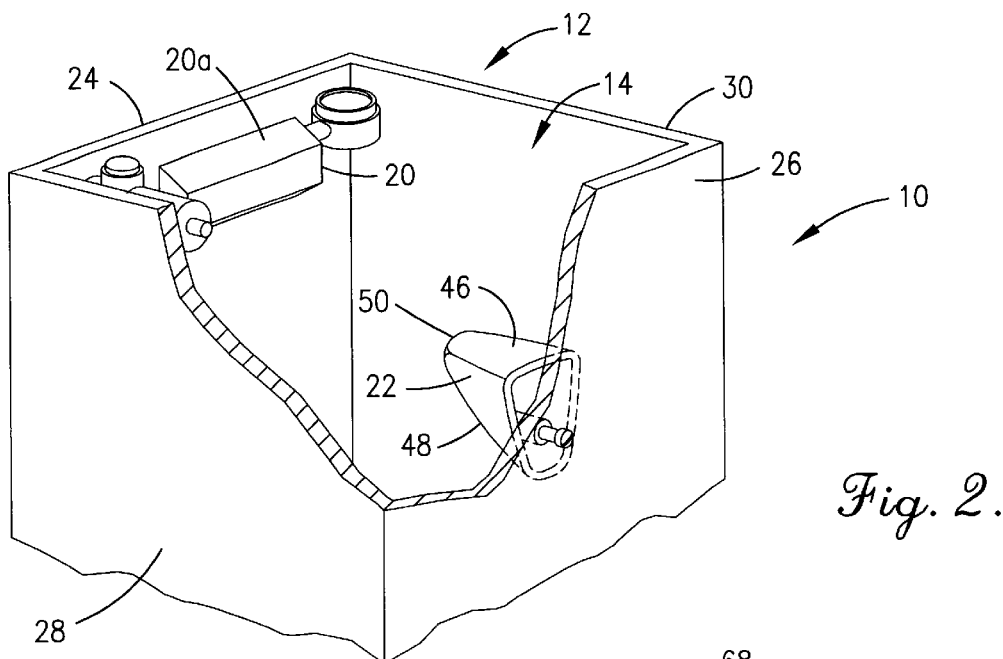
FIG. 2 is a fragmentary perspective view of the stowage box with portions thereof broken away to reveal the internal components of the box, including the two abutments elements.

Referring initially to FIGS. 1 and 2, a stowage box 10 in accordance with the preferred embodiment of the present invention broadly includes structure 12 which defines an enclosure 14 for receiving a flight crew oxygen mask 16, an apertured, hinged top cover 18, and two abutment elements 20, 22 located within the enclosure 14 and inwardly extending from the walls of structure 12.

In more detail, the structure 12 is of integral construction, preferably designed for mounting on or near the floor of the cockpit (not shown) within close proximity of the intended wearer, and includes opposed, spaced apart front and rear walls 24, 26, opposed, spaced apart sidewalls 28, 30 and a bottom wall 32. The walls 24–30 cooperatively receive and support the openable top cover 18.

The mask 16 presents a hollow body 34 and includes an inflatable harness 35 coupled to the mask body 34 for accommodating the head of the wearer and urging the mask 16 firmly against the wearer's face. More particularly, the mask body 34 has a face-engaging resilient periphery 36 which is adapted to surround at least the nose and mouth of a wearer. As a matter of choice, however, the mask 16 could also be configured to receive the full face of the wearer. The mask body 34 also provides an external comfort control switch 38 with a stationary part 39 pivotally supporting a switch member 40 shiftable between a switch-on or "comfort" position and a switch-off or "emergency" position. Finally, mask 16 includes two opposed plates 42, 44, at least one of which is pivotally secured to mask 16 and serves as an actuation lever to activate inflation of the harness. The plates 42, 44 are mounted on each external side 45a, 45b of the mask body 34 for ready access by the wearer's fingers when the mask 16 is retrieved by the wearer from the stowage box 10.

The abutment elements 20, 22 provide means for preventing stowage of the mask 16 in the enclosure 14 when the switch member 40 is in the switch-on or "comfort" position. The first abutment element 20 is operatively coupled to the front wall 24 of the structure 12 and is configured as an elongated block-type body with a beveled upper surface 20a for engaging the stationary part 39 of comfort control switch 38.

The second abutment element 22 is attached to the opposed rear wall 26 of the structure 12 and is configured for receiving and supporting the mask periphery 36. The second abutment element 22 thus presents a horizontal upper surface 46 situated on a plane below the first abutment element 20, and further provides a smoothly contoured oblique surface 48 extending rearwardly from the inboard edge 50 of the upper surface 46 toward the rear wall 26. It will be appreciated that the oblique surface 48 is configured to prevent ensnarement of the harness 35 by the second abutment element 22 during retrieval of the mask 16 from within the enclosure 14.

The elements 20, 22 are configured and arranged to permit proper stowage of the mask 16 within the enclosure 14 only when the switch member 40 is shifted to the switch-off or "emergency" position (as shown in FIG. 1), by presenting an interference which prevents stowage of the mask 16 within the enclosure 14 when the switch member 40 is shifted to the switch-on or "comfort" position (such interference being depicted in phantom in FIG. 1).

When the stowed mask 16 (with switch member 40 shifted to the switch-off or "emergency" position) is initially grasped by the wearer, the fingers and thumb of the wearer will engage the plates 42, 44 to activate the initial full inflation of the harness 35 while the mask 16 is being pulled from the enclosure 14. After donning the mask 16, the wearer then releases the plates 42, 44 which thereby causes the deflation of the harness 35. Once deflated, the harness 35 firmly urges the mask 16 against the wearer's face in order to prevent leakage of oxygen around the periphery 36. It will be appreciated that the retrieval of the mask 16 from within the enclosure 14, the inflation of the harness 35 and the donning of the mask 16 can all be accomplished in an expeditious manner using only one hand of the wearer.

If the fully deflated harness will cause substantial discomfort to the wearer, the wearer may shift the switch member 40 to the switch-on or "comfort" position after donning the mask, but before the plates 42, 44 are released, in order to permit only partial deflation of the harness once the plates 42, 44 are released. The wearer can then engage the plates 42, 44 again in order to slowly reinflate the harness 35 for obtaining optimum comfort. Once use of the mask 16 is no longer required, however, the wearer must shift the switch member 40 to the switch-off or "emergency" position before stowing the mask 16 in the box 10 in order to insure that the harness 35 will fully and quickly inflate in the event rapid donning of the mask 16 is subsequently required. If, for example, the wearer attempts to don the mask when the switch member 40 is shifted to the switch-on or "comfort" position, the harness 35 will slowly inflate (for comfort adjustment purposes), and the wearer will be unable to quickly place the harness over the wearer's head and appropriately don the mask with only one hand.

In the event the wearer inadvertently fails to shift the switch member 40 to the switch-off or "emergency" position at such time as the mask 16 is being stored within the enclosure, the switch member 40 will engage the upper surface 20a of first abutment element 20 and thereby cause the mask 16 to rotate downward about the point of engagement. The rotation will abruptly terminate upon engagement of the second abutment element 22 with the periphery 36, which will also preclude further downward movement of the mask body 34 within the enclosure 14. Excessive protrusion of the mask body 34 through the top cover 18 will result from such improper storage of the mask 16, and will effectively alert the wearer of the need to shift the switch member 40 to the switch-off or "emergency" position prior to storage of the mask 16 within the enclosure 14. Furthermore, shifting of the switch member 40 from the switch-off or "emergency" position to the switch-on or "comfort" position when the mask 16 is properly stowed within the enclosure 14 will be effectively precluded by the interference provided by engagement of the first abutment element 20 with the switch member 40, such interference being sustained by the engagement of the second abutment element 22 with the periphery 36.

Figure 3:
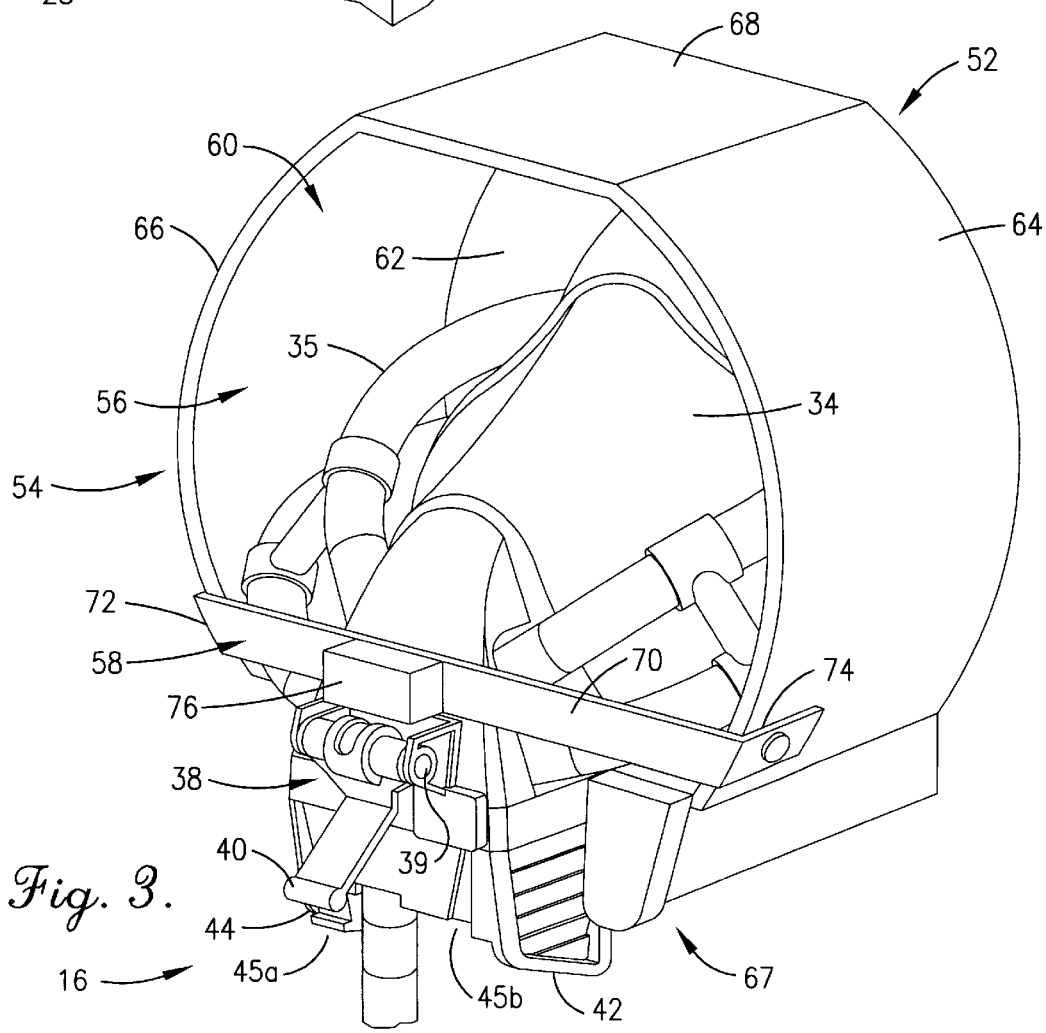
FIG. 3 is a perspective view of a second embodiment of the present invention.

FIG. 3 depicts another embodiment in accordance with the present invention, wherein the stowage box 52 broadly includes wall structure 54 which defines an enclosure 56 for receiving the mask 16 and a retainer structure 58 operatively connected to the wall structure 54.

In more detail, the wall structure 54 is of integral construction and designed for mounting on the wall of the cockpit (not shown) within close proximity of the intended wearer. The wall structure 54 presents an opening 60 through which a portion of the mask body 34 protrudes for ready access by the wearer, which wall structure 54 includes a back wall 62, a pair of arcuate sidewalls 64, 66 terminating in a mouth region 67 situated at the bottom of the wall structure 54, and a planar top section 68.

The retainer structure 58 provides means for preventing stowage of the mask 16 in the enclosure 56 when the switch member 40 is in the switch-on or "comfort" position (such switch position not being depicted in FIG. 3), and includes an elongated band 70 with end 72 of the band 70 secured at sidewall 66 and end 74 of band 70 detachably coupled at sidewall 64. It will be appreciated, however, that such detachable coupling of band end 74 to sidewall 64 will not otherwise hinder removal of mask 16 from enclosure 56 for rapid donning by the wearer. The band 70 has sufficient horizontal length to span the opening 60 while being vertically oriented to engage and retain the mask body 34 stored within the enclosure 56. The band 70 includes an outwardly extending abutment element 76 intermediately located between the ends 72, 74.

In the event the wearer inadvertently fails to shift the switch member 40 to the switch-off or the "emergency" position at such time as the mask 16 is being stored within the enclosure 56, the band 70 will engage the switch member 40 protruding outwardly from the enclosure 56 in lieu of the mask body 34 situated inwardly therefrom, and therefore be of insufficient length to extend across the opening 60 and be properly coupled to the sidewall 64. The inability of the wearer to properly couple the end 74 of band 70 to the sidewall 64 should effectively alert the wearer of the need to shift the switch member 40 to the switch-off or "emergency" position (such position being depicted in FIG. 3) prior to storage of the mask 16. Furthermore, once the mask 16 has been properly stored within the enclosure 56 and the end 74 of band 70 has been properly coupled to the sidewall 64, any shifting of the switch member 40 from the switch-off or "emergency" position to the switch-on or "comfort" position will be appropriately precluded by the interference provided by engagement of the abutment element 76 with the switch member 40.

It should now be realized by those skilled in the art that the present invention represents an especially effective means for counteracting human error when the user attempts to store the mask while the switch member is in the switch-on or "comfort" position. In this regard, a stowage box constructed in accordance with the present invention facilitates regulatory compliance and promotes aircraft safety in respect of the requirement and need for rapid donning of the flight crew oxygen mask.

It will be readily appreciated that the embodiment of the present invention admits many variations and alterations. Such would include use of various materials for forming the structures (e.g., lightweight metal or synthetic resin material). It is, of course, intended that all such variations and alterations be included within the fair scope of the claims hereof.

We claim:

1. A stowage box adapted for a crew oxygen mask, said mask presenting a hollow body having a face-engaging periphery and adapted to receive at least the nose and mouth of a wearer, said body having a switch member shiftable between a switch-on and switch-off position, said stowage box comprising:

walls defining a mask-receiving enclosure and presenting an opening which is adapted to allow at least a portion of the hollow mask body to protrude for ready access by the wearer when the mask is received therein; and a retainer operatively connected to said enclosure with at least a portion of the retainer adapted to engage the hollow mask body when the latter is in said enclosure and when the mask's switch member is in one of the switch-on or switch-off positions, said retainer preventing stowage of the hollow mask body within said enclosure when the mask's switch member is in the other of the switch-on or switch-off positions, said retainer including an abutment configured for engaging the mask's switch member.

2. A stowage box as set forth in claim 1, said retainer comprising an elongated band operatively coupled at one end thereof to the enclosure and of a length to extend across said opening and adapted to engage the hollow mask body, the other end of said band being detachably securable to said enclosure.

3. A stowage box as set forth in claim 2, said band including an outwardly extending abutment secured thereto and intermediate said ends thereof and located for preventing movement of the mask's switch member between the switch-on and switch-off positions when the mask is stowed within said enclosure.

4. A stowage box for a crew oxygen mask, the mask presenting a hollow mask body having a face-engaging periphery and adapted to receive at least the nose and mouth of a wearer, the hollow mask body having an external switch member shiftable between a switch-on and switch-off position, said stowage box comprising:

structure defining a mask-receiving enclosure and including opposed, spaced apart front and rear walls, spaced apart sidewalls interconnecting the front and rear walls and an apertured top cover adapted to permit at least a portion of the hollow mask body to protrude therethrough when the mask is received within said enclosure for ready access by said wearer; and means for preventing stowage of the mask in said enclosure when the mask's switch member is in one of the switch-on or switch-off positions while permitting such stowage when the switch member is in the other of the switch on or switch off positions, said stowage-preventing means comprising inwardly extending, first and second abutment elements operatively coupled to said front and rear walls respectively, one of said first and second elements being configured for engaging the mask's switch member adjacent said body, the other of said first and second elements being configured for engaging the mask's periphery.

5. A stowage box as set forth in claim 4, the mask including a harness operatively coupled to the mask's hollow mask body for accommnodating the head of the wearer and pulling the mask toward the face of the wearer, said other element of said first and second elements presenting a smoothly contoured outer surface preventing ensnarement of the mask's harness by said other element during retrieval of the mask from said enclosure.

6. A stowage box as set forth in claim 4, said other element of said first and second elements having an upwardly facing surface for receiving and supporting the mask's body periphery.

7. A stowage box as set forth in claim 4, said other element of said first and second elements having a generally horizontal upper surface disposed below said one element.

8. A stowage box as set forth in claim 7, said other element of said first and second elements including an oblique surface extending rearwardly from the inboard margin of said upper surface towards said rear wall.

9. A stowage box for a crew oxygen mask, the mask presenting a hollow mask body having a face-engaging periphery and adapted to receive at least the nose and mouth of a wearer, the hollow mask body having an external switch member shifiable between a switch-on and switch-off position, said stowage box comprising:

a mask-receiving enclosure and including opposed, spaced apart front and rear walls, spaced apart sidewalls interconnecting the front and rear walls and an apertured top cover adapted to permit at least a portion of the hollow mask body to protrude therethrough when the mask is stowed therein for ready access by said wearer; and first and second inwardly extending abutment elements operatively coupled to said front and rear walls respectively, one of said first and second elements being configured for engaging the mask's switch member adjacent the mask's hollow body, the other of said first and second elements being configured for engaging the mask's periphery, said abutment elements configured for cooperatively preventing stowage of the mask in said enclosure when the mask's switch member is in one of the switch-on or switch-off positions while permitting such stowage when the switch member is in the other of the switch on or switch off positions.

10. A stowage box as set forth in claim 9, said other element of said first and second elements having an upwardly facing surface for receiving and supporting the mask's body periphery.

11. A stowage box as set forth in claim 9, said other element of said first and second elements having a generally horizontal upper surface disposed below said one element of said first and second elements.

12. A stowage box as set forth in claim 11, said other element of said first and second elements including an oblique wall extending rearwardly from the inboard margin of said upper surface.

* * * * *